Figure 3:
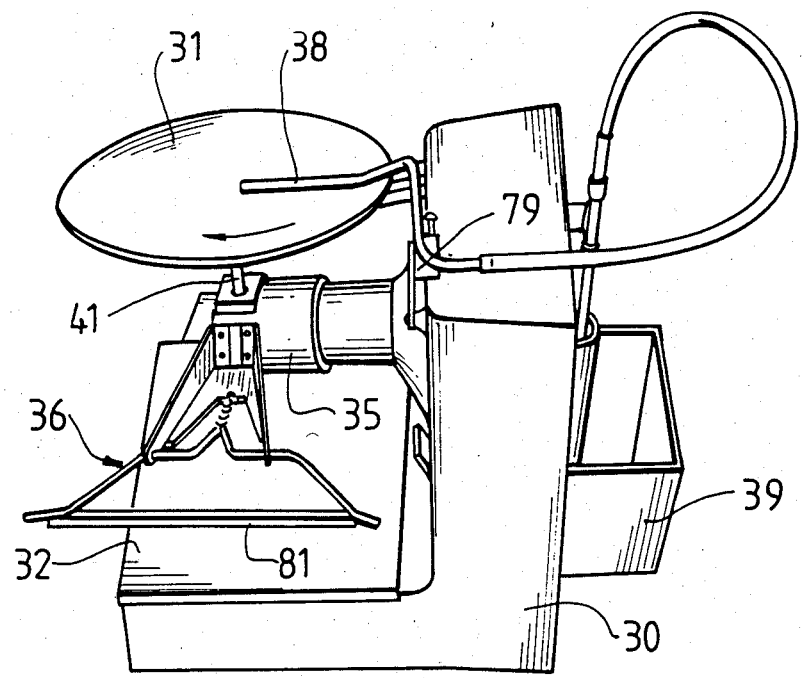

United States Patent [19]

Merdy

[11] Patent Number: 4,733,608
[45] Date of Patent: Mar. 29, 1988

[54] MACHINE FOR MAKING CREPES

[76] Inventor: Leon Merdy, 107 Victoria Avenue, Chelmer, Queensland 4068, Australia

[21] Appl. No.: 934,558
[22] PCT Filed: Feb. 26, 1986
[86] PCT No.: PCT/AU86/00046
  § 371 Date: Oct. 21, 1986
  § 102(e) Date: Oct. 21, 1986
[87] PCT Pub. No.: WO86/05070
  PCT Pub. Date: Sep. 12, 1986

[30] Foreign Application Priority Data

Feb. 27, 1985 [AU] Australia .............................. PG9494

[51] Int. Cl.[4] .......................... A47J 37/10; A21B 1/42
[52] U.S. Cl. .......................................... 99/423; 99/424; 99/353
[58] Field of Search ................. 99/422, 423, 424, 353, 99/443 C, 355, 443 R; 426/438, 657

[56] References Cited

U.S. PATENT DOCUMENTS

| | | | |
|---|---|---|---|
| 1,869,541 | 8/1932 | Brand | 99/424 |
| 3,215,062 | 11/1965 | Frankenberg | 99/424 X |
| 3,683,150 | 8/1972 | Kehl et al. | 99/423 X |
| 3,718,487 | 2/1973 | Brunner | 99/353 |
| 4,083,296 | 4/1978 | Mede et al. | 99/423 |
| 4,280,402 | 7/1981 | Featherstone | 99/423 X |
| 4,508,025 | 4/1985 | Schultz | 99/353 |

FOREIGN PATENT DOCUMENTS 2365293  4/1978  France ................................. 99/422

*Primary Examiner*—James Kee Chi
*Attorney, Agent, or Firm*—Dilworth & Barrese

[57] ABSTRACT

A machine for manufacturing cooked foodstuffs such as crepes comprises an upwardly directed rotatable concave hot plate (31) which is slightly inclined. A radially disposed pouring tube (38) is arranged above the plate (31) and has holes (78) for dispensing pre-made food mixture onto the plate (31) in a manner causing a constant quantity of mixture per surface area of the plate whereby a thin uniform disc of the mixture is formed. A heating element (33) heats the plate (31) to cook one side of the disc and the plate (31) is mounted on a hub (35) which, upon rotation inverts the plate (31) enabling the partially cooked disc to the dispensed onto a flat further hot plate (32) such that the other side is then cooked. A pump unit (37) pumps the mixture from a tank (39) to the pouring tube (38). A spatula (34) assists in dispensing the partially cooked disc from the hot plate (31). The machine operates cyclically and automatically while mixture remains in the tank (39).

14 Claims, 30 Drawing Figures

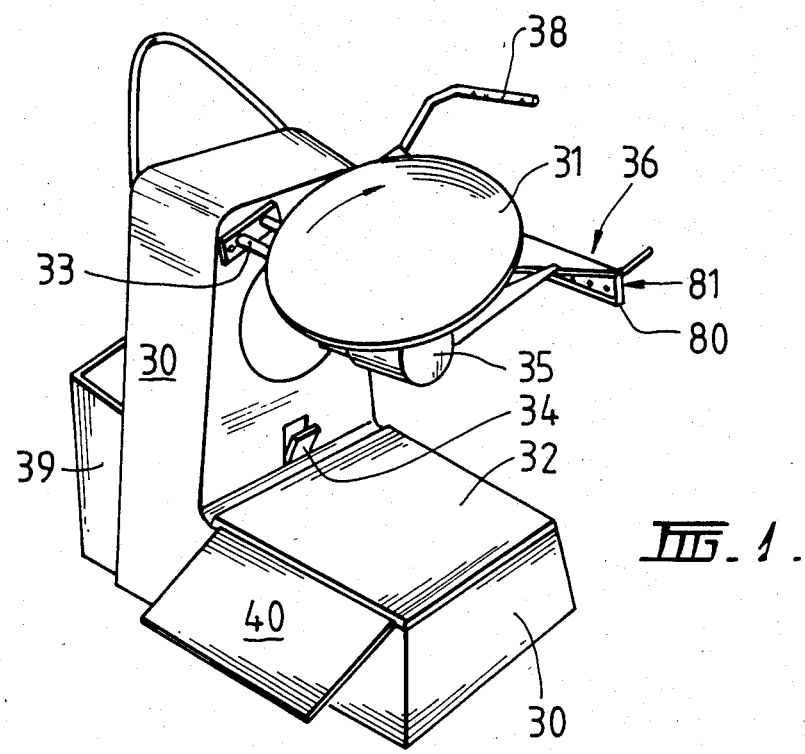
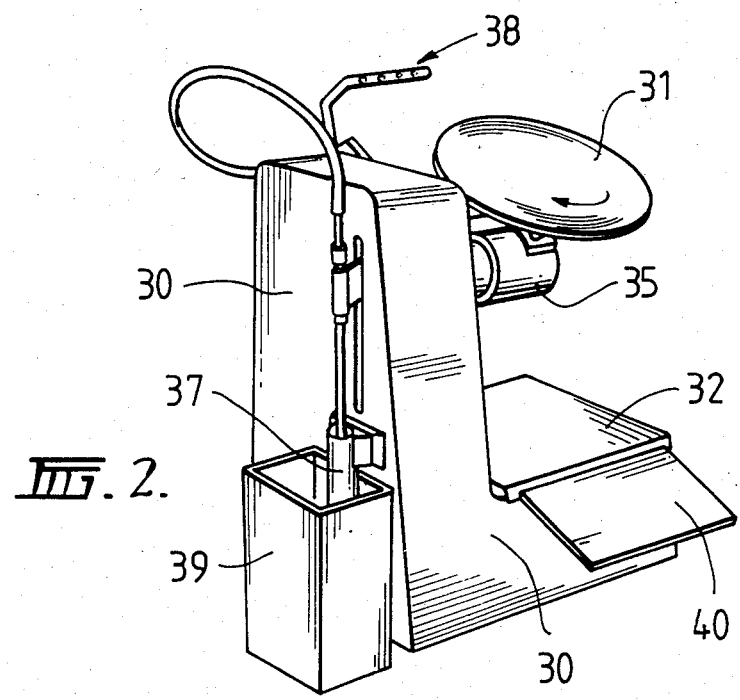

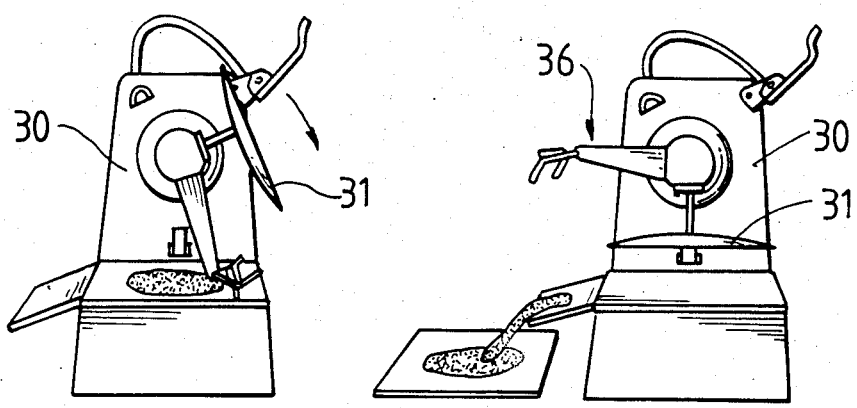
FIG. 11.
FIG. 12.
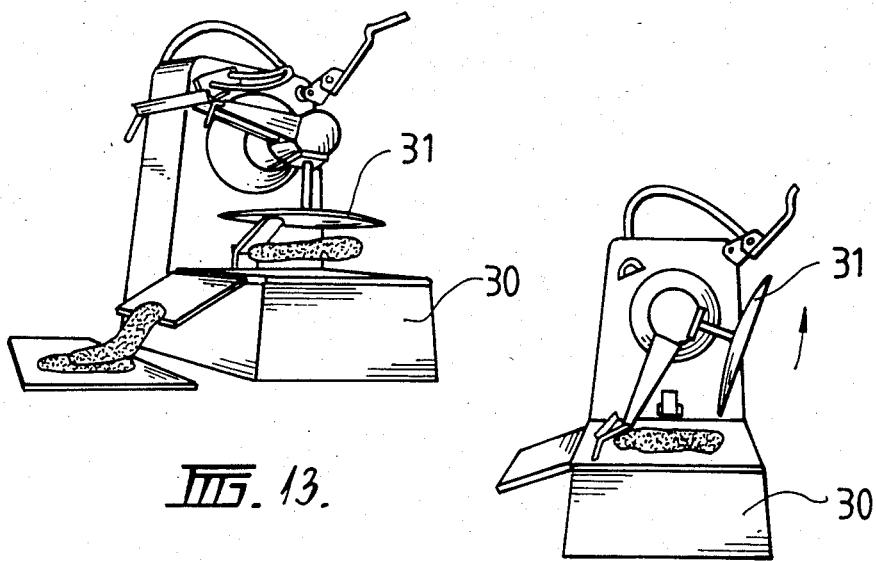
FIG. 13.
FIG. 14.

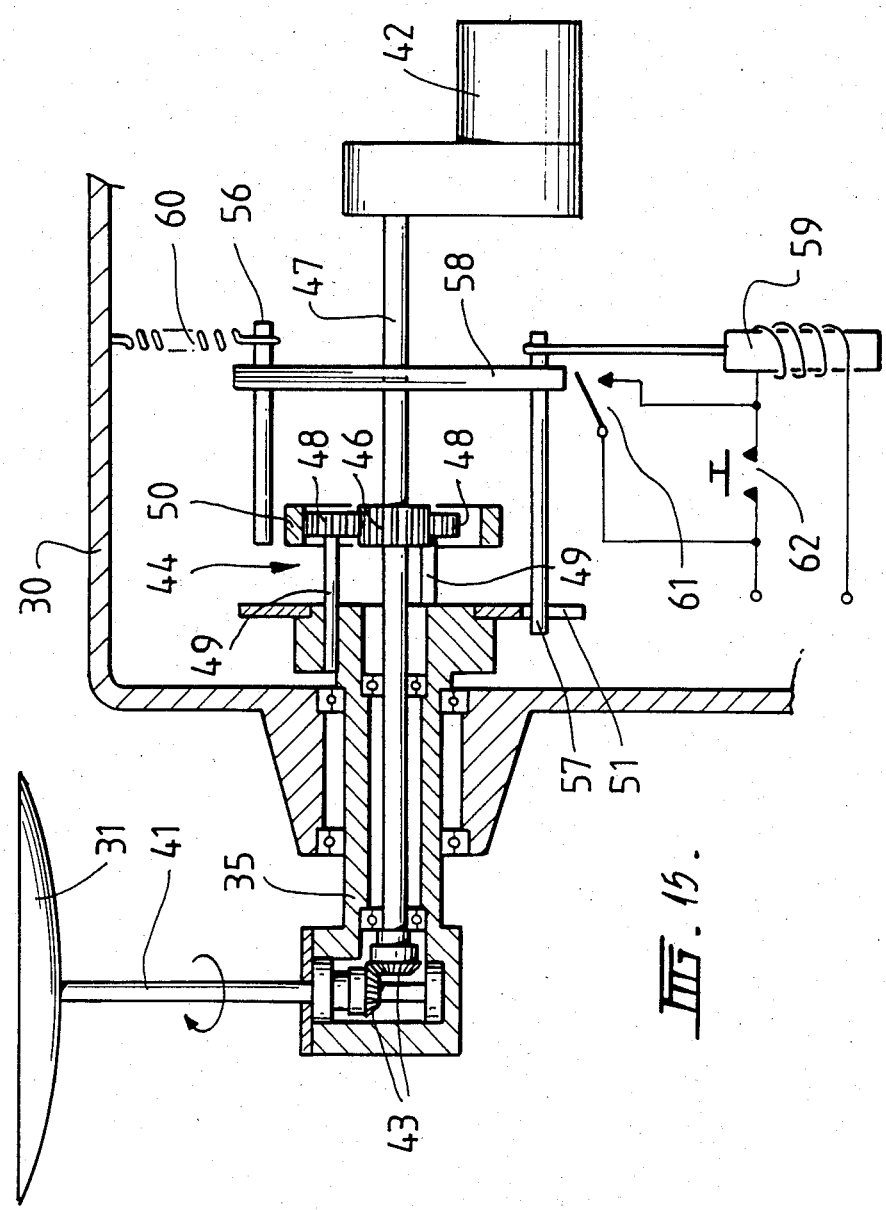

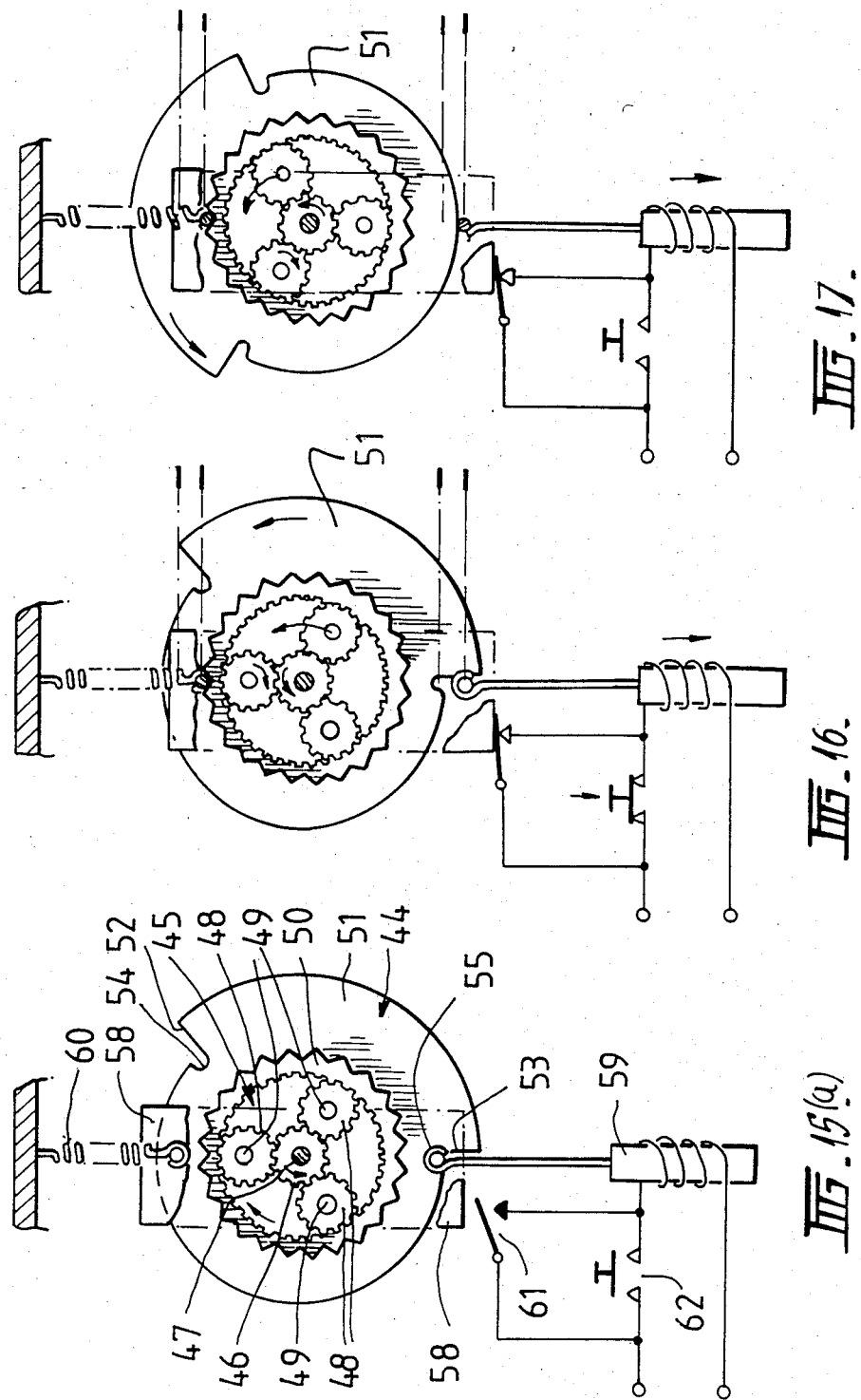

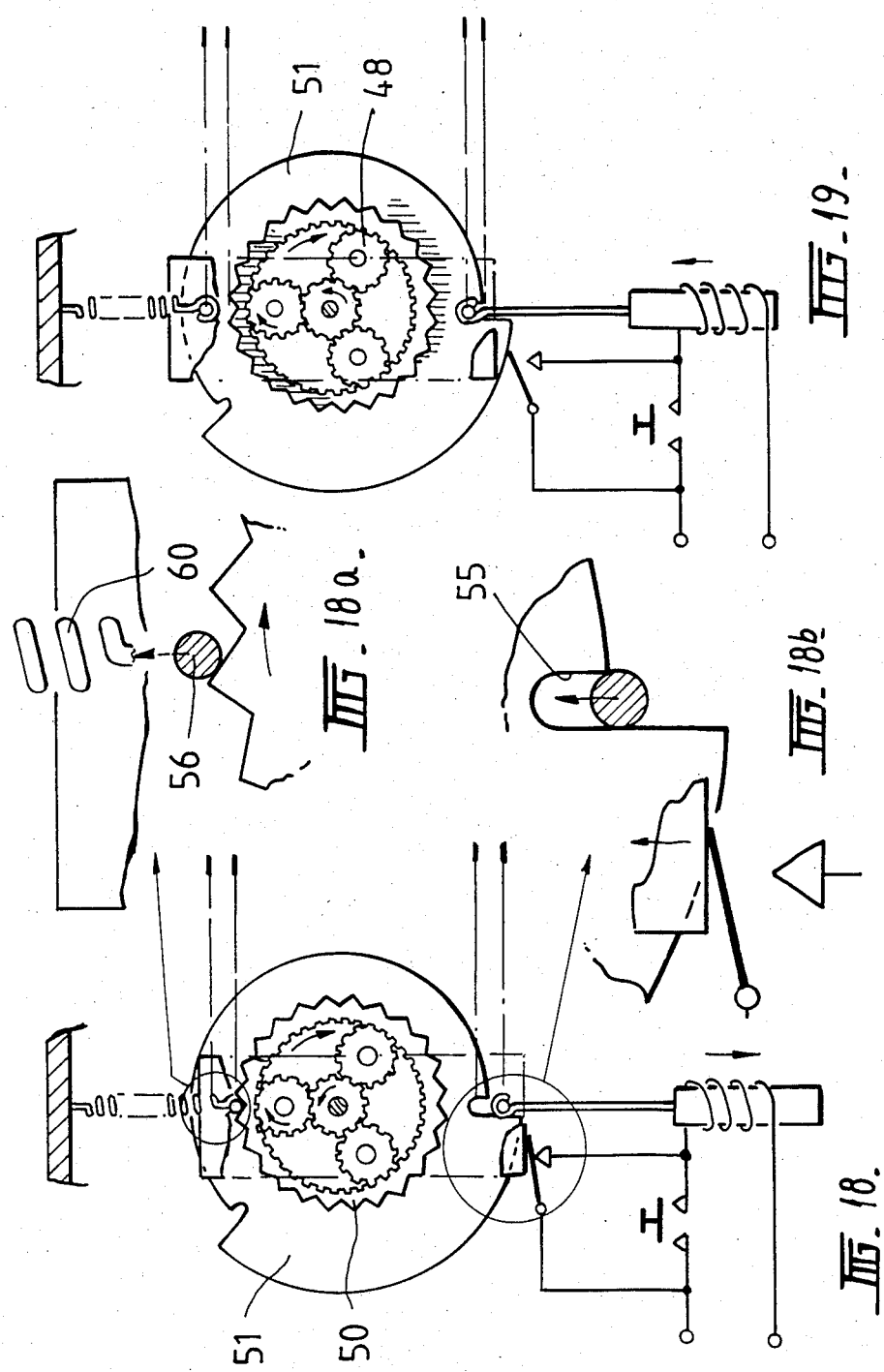

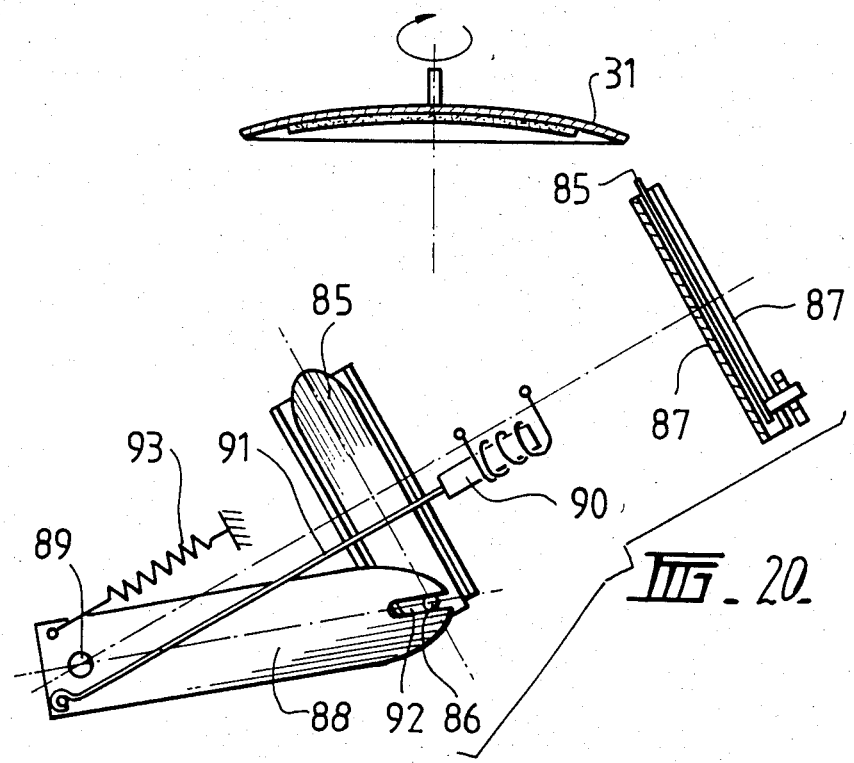
FIG_20.
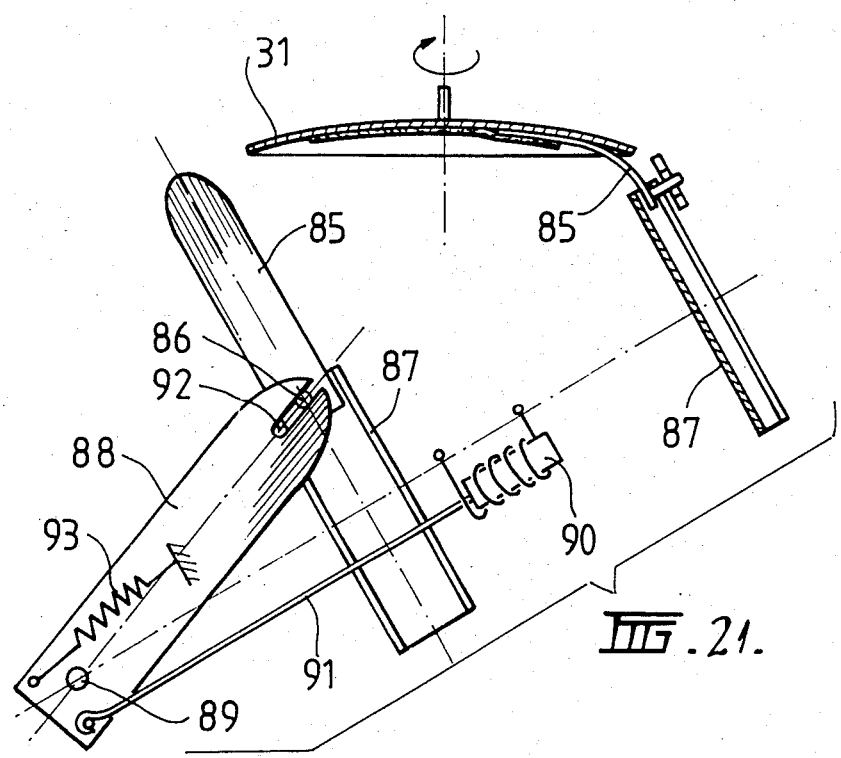
FIG_21.

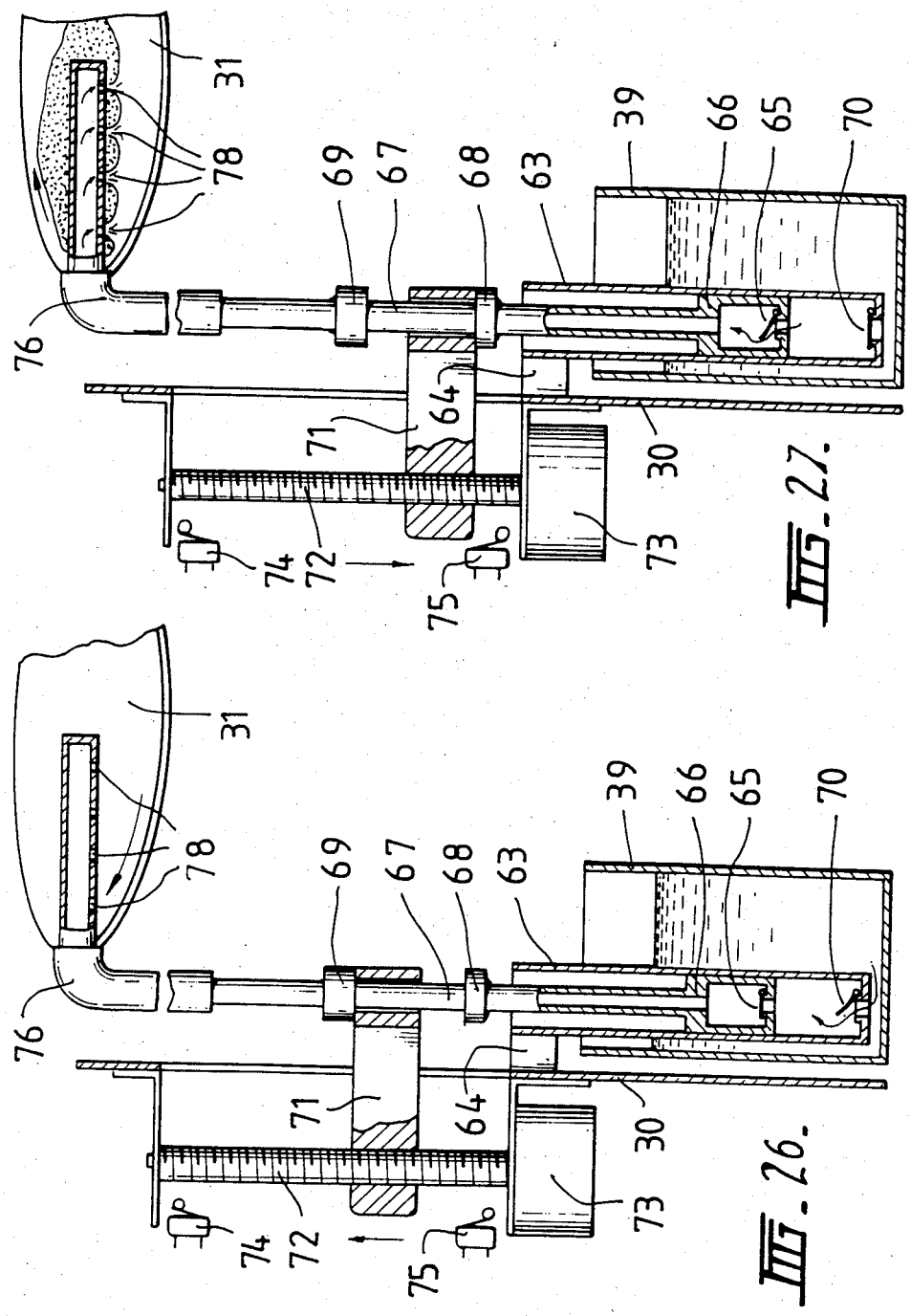

MACHINE FOR MAKING CREPES

This invention relates to apparatus for manufacturing cooked foodstuffs and in particular to apparatus for manufacturing foodstuffs of the kind made from batter such as for example, crepes.

The traditional method of manufacturing crepes involves pouring a desired amount of pre-made batter into a preheated frying pan, manually wobbling the pan to distribute the batter evenly over the pan surface, placing the pan on a heat source to cook the underside of the crepe and then inverting the crepe to cook the other side. The traditional method requires particular culinary skills on the part of the chef in order to produce a good quality crepe. A good quality crepe according to the connoisseur is very thin and of an even thickness and whilst the present invention is not limited to apparatus exclusively for making crepes, it is intended to be capable of manufacturing a good quality crepe.

Various forms of apparatus have been proposed in the past for manufacturing foodstuffs of the general kind in consideration here such as pancakes, pikelets, crepes, and so called "skins" for use in making "chicken rolls" and the like. All the known forms of apparatus suffer from one or more of the following disadvantages. Either they are complex and hence costly to manufacture, they are not fully automatic in the sense that they still require an operator to perform some of the operations manually, or they are not capable of manufacturing a crepe of good quality as defined above. The complexity and hence cost of manufacture generally renders the known apparatus unsuitable for use as a domestic appliance and usually limits use to large commercial use or perhaps use in an industrial situation where foodstuffs are manufactured for sale as frozen foodstuffs.

It is an object of the present invention to provide an improved apparatus for manufacturing cooked foodstuffs of the kind made from batter, which apparatus overcomes one or more of the aforementiond disadvantages of known apparatus.

Accordingly, one broad form of the invention which may be preferred provides a machine for manufacturing cooked foodstuffs in the form of crepes and the like, characterized in that, said machine includes a first hot plate in the form of a rotatable disc, a pouring tube over said plate for dispensing a predetermined amount of a pre-made food mixture onto an upwardly directed cooking surface of said plate, said surface is inclined to the horizontal and has a shape adapted to form said mixture thereon into a substantially disc-like configuration during rotation, said pouring tube extends substantially radially over said plate and the direction of rotation relative to said tube is such as to carry said mixture upwardly on the slope of said inclined surface, the pouring tube being adapted to dispense a substantially constant quantity of mixture per surface area of the plate, whereby a substantially constant thickness of mixture is achieved on said surface, and said first hot plate is adapted for movement to an inverted position, when one side of said foodstuff is cooked, wherein said partly cooked foodstuff is released so as to fall onto a second hot plate for cooking the other side thereof.

Figure 4:
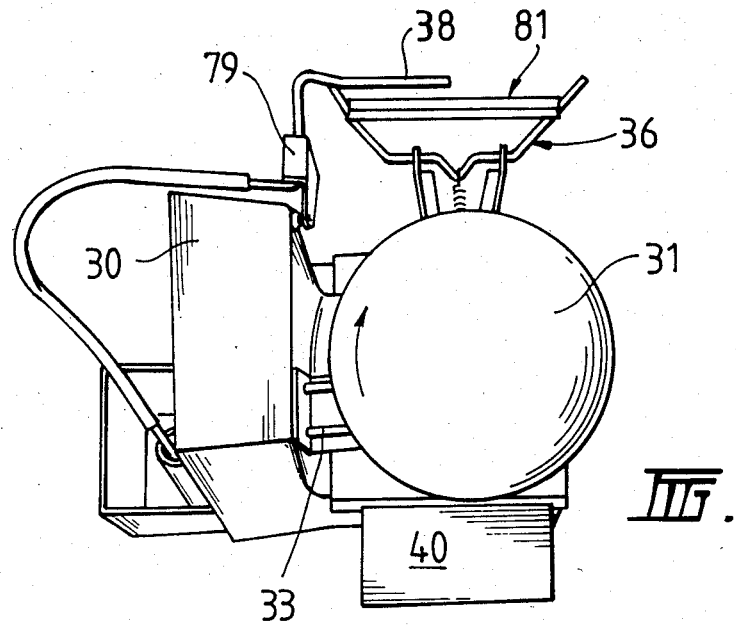

In order that the invention may be more readily understood, one particular embodiment will now be described with reference to the accompanying drawings wherein, FIG. 1 is a perspective front view of apparatus for manufacturing crepes, FIG. 2 is a perspective rear view of the apparatus of FIG. 1, FIG. 3 is a perspective side view of the apparatus of FIG. 1, FIG. 4 is a perspective plan view of the apparatus of FIG. 1, FIGS. 5 to 14 are perspective views from various different angles showing the machine in different stages of operation, FIG. 15 is a part sectional side elevation through the centre of the apparatus, FIG. 15($a$) is a section on the line 2—2 of FIG. 15, FIGS. 16 to 19 are similar to FIG. 15($a$) and show various positions of the clutch mechanism of the apparatus, FIGS. 20 and 21 are part sectional views of the apparatus showing operation of a skimmer or spatula mechanism of the apparatus, FIGS. 22 to 25 are schematic diagrams showing various stages of operation of an ejector mechanism for removing a finished product from the apparatus, and FIGS. 26 and 27 are simplified schematic diagrams showing the two positions of a pump mechanism of the apparatus.

Referring now to the drawings and particularly to FIGS. 1-4, the apparatus or machine is shown to comprise essentially a body portion 30, an upper hot plate 31, a lower hot plate 32, an upper hot plate heating element 33, a spatula or skimmer 34, a rotatable hub 35, an ejector 36, a pump unit 37, a pouring tube 38, a tank 39 and an exit ramp 40. A lower hot plate heating element (not shown) is located within the body portion 30 immediately below the lower hot plate 32.

The apparatus according to this embodiment is electrically operated by means of a power cord (not shown) which may be inserted in any general purpose power outlet. Thus, the upper and lower hot plate heating elements are electric elements which are connected to the supply by electrical connections (not shown) within the body portion 30. Similarly, an electric motor for operating the apparatus and various solenoids within the body portion 30 are connected via electrical connections (not shown) to the power supply.

The upper hot plate 31 is an upwardly directed concave plate which is circular and is mounted via a rotatable spindle 41, on the hub 35. In the normal or neutral position of the apparatus, that is, when the apparatus is in the off or start position, the spindle 41 is inclined to the vertical at an angle of about 20° such that the concave upper hot plate 31 is tilted at about 20° with respect to the horizontal. A geared reversible motor 42 (FIG. 15) is located within the body portion 30 and is adapted to drive the upper hot plate 31 in order to rotate the concave disc, via a bevel gear 43. The motor 42 is also used to drive the hub 35 in a rotational direction by means of a special clutch 44 comprising essentially an epicyclic gear train 45. The epicyclic gear train 45 is more clearly depicted in FIGS. 15 to 19 of the drawings.

The epicyclic gear train 45 consists essentially of a pinion gear 46 which is fixed to drive shaft 47 of motor 42 and three satellite gears 48 which are free running on spindles 49 fixed in relation to the rotatable hub 35. A crown gear 50 is normally free running on the satellite gears 48 and the crown gear has a toothed outer surface as is shown clearly in FIG. 15($a$). A circular cam 51 is fixed to the hub 35 and has two stop surfaces 52 and 53 respectively, each of which includes a notch 54 and 55 respectively. Two spigots 56 and 57 of different lengths are mounted on a slider 58 which can be actuated by a solenoid 59 and a return spring 60. The longest spigot, that is, spigot 57, is normally engaged in cam notch 55 as is shown in FIG. 15(a). Operation of the solenoid 59 will cause the slider 58 to move downwardly and close microswitch 61. A relay contact 62 is momentarily closed by a control circuit (not shown) when the clutch is required to be used during a machine cycle as will be become apparent hereinbelow.

The clutch operates as follows. In the initial part of the machine cycle, the upper hot plate 31 is rotating in the direction of the arrows shown in FIGS. 1 to 4 and as is also shown by the arrow in FIG. 15. At a particular point in the machine cycle, it is necessary to rotate the hub 35 through approximately 200°, (180°+20°) in order to invert the upper hot plate 31. Prior to this operation, the spigot 57 is engaged in the cam 51 as shown in FIG. 15(a). At the appropriate time, relay contact 62 is closed and the solenoid 59 is energized. The slider 58 is pulled down by the solenoid and causes the microswitch 61 to close. The contact 62 is then released but the solenoid will stay energized via the microswitch 61. When the slider 58 is attracted by the solenoid 59 it disengages the spigot 57 from cam 51 and at the same time causes the spigot 56 to engage the toothed outer surface of the crown gear 50 thereby stopping rotation of the crown gear (see FIG. 16). It follows that the cam 51 and the hub 35 on which it is mounted rotate at a reduced speed in relation to the speed of the shaft 47, in the direction indicated by the arrows shown on FIGS. 16 and 17. Once the cam stop surface 52 comes into contact with the spigot 57, rotation of the hub is prevented and the crown gear 50 commences rotation forcing the spigot 56 out of the toothed outer surface of the crown gear whereby the slider 58 is raised causing opening of the microswitch 61 and de-energization of the solenoid. This latter operation is clearly depicted in FIG. 18 and the enlargements thereof. The return spring 60 completes movement of the slider 58 to its uppermost position wherein the cam 51 and the hub 35 are immobilized and the crown gear 50 is free running. With the hub 35 in the position resulting from movement of the cam 51 to the positions shown in FIGS. 18 and 19, the upper hot plate 31 is inverted and is able to continue rotation in its initial direction of rotation.

Reverse motion of the hub 35 to return the upper hot plate 31 to its initial position is achieved by reversing direction of rotation of the motor 42 by means of the control circuit (not shown) and applying an impulse to the relay contact 62. It should be pointed out that any angle of rotation of the hub 35 can be achieved by means of the unique clutch arrangement merely by altering the configuration of the stop surfaces 52 and 53. Clearly the clutch arrangement is a unique clutch arrangement which may be used in apparatus other than the apparatus described herein. It is conceivable that the clutch could be used to facilitate rotation of the hub through any fractional number of revolutions greater than one revolution merely by separating the second stop surface 53 from the first stop surface 52 by a predetermined gear reduction.

Reference should now be made to FIGS. 26 and 27 which disclose in detail the pump unit 37 for the purpose of pumping a pre-made batter mix from tank 39 to the pouring tube 38 for distribution onto the upper hot plate 31. The pump consists essentially of a cylinder 63 provided at its top end with a holding bracket 64 which affixes the cylinder 63 to the body portion 30. The bottom end of the cylinder 63 contains a valve 65 which is a flap type valve which in a closed position locks an orifice in the bottom end of the cyliner 63. A hollow piston 66 is arranged to slide vertically within the cylinder 63 and has a hollow rod 67 extending upwardly therefrom such that the internal bore of the rod 67 communicates with the internal bore of the hollow piston 66. A fixed collar 68 and an adjustable collar 69 are provided on the rod 67 and a further valve 70 is provided in the piston 66 for the purpose of closing the bottom end of the hollow piston. Again the valve is a flap type valve similar to the valve 65. The pump is driven by means of a nut 71 having a pair of fingers which extend through a slot in the side of the body portion 30 and engage on either side of the rod 67 whereby the rod may be raised or lowered by the fingers engaging the aforementioned collars 68 and 69. The nut 71 is mounted on a lead screw 72 driven by a reversible motor 73 such that rotation of the motor causes the nut 71 to move up and down on the lead screw 72 depending on the direction of rotation. An upper limit switch 74 and a lower limit switch 75 are contacted by the nut 71 at the extremities of its travel and cause reversal of the motor direction. A flexible tube 76 is connected to the upper end of the rod 67 for the purpose of transmitting fluid from the rod 67 to the pouring tube 38 which will be described hereinbelow. A tank 39 is adapted for positioning around the cylinder 63 such that the cylinder 63 extends downwardly within the tank to a point adjacent the bottom thereof.

In use of the apparatus the tank 39 is filled with a batter mixture suitable for producing crepes. The adjustable collar 69 is adjusted so as to set the stroke of the piston 66 so that the pump unit 37 will pump the desired amount of ingredients (batter mix) during each stroke thereof. At the commencement of the machine cycle, the motor 73 drives the nut 71 upwardly which in turn pushes the piston upwardly once the fingers of the nut 71 contact the adjustable collar 69. Upward movement of the piston causes the valve 65 to open and the valve 70 to close and thus causes the ingredients to be drawn into the bottom end of the cylinder 63 from the tank 39. The operation of the valve is caused by a reduction in pressure within the bottom end of the cylinder 63. When the nut 71 contacts the upper limit switch 74, the direction of rotation of the motor 73 is reversed at which time the cylinder 63 below the piston 66 is full of the batter mix. Downward movement of the nut 71 causes the fingers thereof to contact the fixed collar 68 thus forcing the rod and hence the piston 66 downwardly. Downward movement of the piston causes valve 65 to open and valve 70 to close and the batter mix is therefore pushed upwards in the hollow rod 67 to the pouring tube 38 here is is dispensed out through holes 78 in the pouring tube.

The pouring tube 38 is a tube closed at one end and, as mentioned above, has a number of holes 78 spaced therealong for the purpose of discharging the batter mix onto the upper hot plate 31. The holes are spaced at varying distances apart and have differing diameters so that the amount of mixture discharged over a radial distance varies according to the variation in surface area of the plate such that batter mix per surface area is substantially equal when it spreads on the plate 31. In other words, the holes 78 are closer together and have a larger diameter towards the outer edge of the plate 31 so that more batter mix is discharged as the radial distance from the centre of the plate increases to take into account the additional surface area. It should be noted that when the pouring tube 38 is in position over the upper hot plate 31 ready for pouring, it extends in a radial direction over the plate and the direction of rotation of the plate is such that batter mix falling onto the plate is carried in uphill direction on the plate 31. Thus, there is a tendency for the mixture to run back down towards a position below the pouring tube 38 whilst at the same time further mixture is being dispensed onto the plate through the pouring tube 38. The combination of the angle of inclination of the plate, the speed of rotation thereof and the degree of concavity of the plate ensures that a disc-like formation is made on the plate by the mixture. The disc-like formation can be arranged to be very thin and is of consistent thickness enabling manufacture of a good quality crepe.

The pouring tube 38 is mounted on a bracket 79 (FIGS. 3 and 4) which can be clipped onto a shaft (not clearly evident in the drawings) driven by a geared reversible motor (not shown) equipped with two limit switches (not shown). The motor and limits switches are mounted within the body portion 30 and are adapted to rotate the shaft from a first position wherein the pouring tube 38 is over the hot plate 31 to the second position wherein the pouring tube is away from the hot plate so as to avoid coagulation of the batter mix during a cooking operation and also to allow for rotational movement of the hub 35 whereby the plate 31 is swung downwardly to an inverted position below the hub. Furthermore, when the pouring tube 38 is moved to the second position away from the plate 31, the holes 78 are upwardly directed so as to avoid dripping of the mixture between operations of the pump unit 37.

Figure 22:
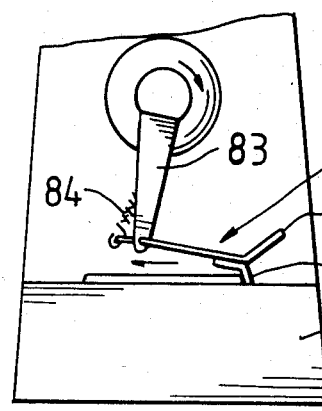
Figure 23:
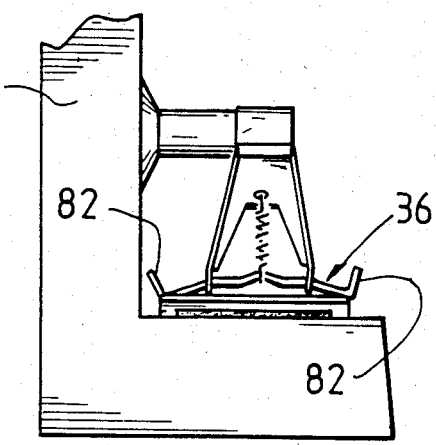
Figure 24:
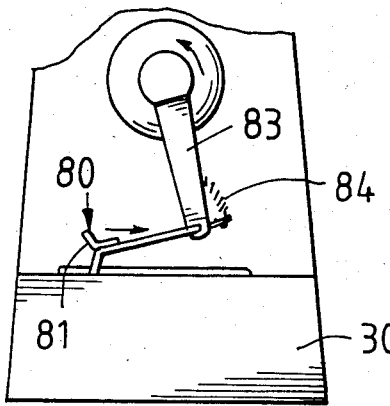
Figure 25:
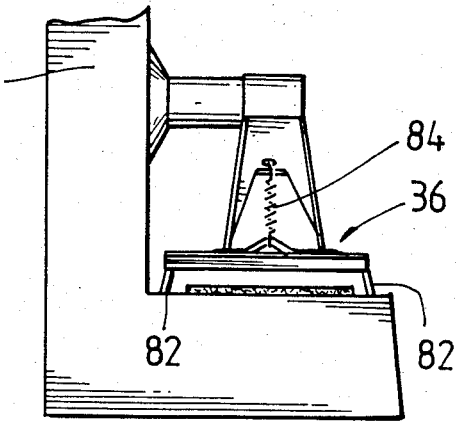

The ejector 36 is used for the purpose of ejecting a finished product from the lower hot plate 32. The construction of the ejector 36 is apparent in FIGS. 1, 3 and 4 and its operation will be described with reference to FIGS. 22 to 25. The ejector consists of a Teflon blade 80 fixed on a V-shaped frame by means of a stainless steel angle 81. The V-shaped frame has opposed side members 82 which, in the initial position of the frame at the commencement of a machine cycle, extend upwardly above the position of the blade 80. The V-shape frame is mounted on a bracket 83 which is fixed to the rotatable hub 35. The V-shaped frame is maintained in a position where it is effectively an extension of the bracket 83 by means of a spring 84. As will be evident in FIGS. 22 to 25 which are simplified drawings for the purpose of describing the ejector and thus exclude other components of the apparatus, rotation of the hub 35 causes the bracket 83 and hence the V-shaped frame and blade 80 to rotate therewith in a clockwise direction as shown in FIG. 22. As soon as the teflon blade 80 touches the lower hot plate 32, the relative position of the V-shaped frame in relation to the bracket 83 changes due to the pivotal connection therebetween and the spring 84 is extended. The blade 80 moves across the surface of the plate 32 and removes a completed crepe on the hot plate 32. The finished product is pushed sideways to the exit ramp 40 where it is able to slide down the ramp and onto a collection surface. Continued rotation of the hub in the same direction causes the bracket 83 to move to a position best shown in FIGS. 12 and 13 wherein the blade has passed over the plate 32 and the spring 84 is able to pull the V-shaped bracket back into a position where it is an extension of the bracket 83. In this extreme position the side members 82 are facing in a downward direction. Reverse rotation of the hub 35 causes the bracket 83 and hence the blade 80 to return in an anti-clockwise direction as viewed in FIG. 24, for example, in which case the side members 82 contact the surface of plate 32 and the blade 80 which is then upwardly directed, is prevented from contact with the plate 32. Again the spring 84 extends and the side members 82 move across the hot plate 32 on either side of a partly prepared crepe which has been released onto the plate 32. Thus, the ejector is able to return to its initial position without disturbing the next crepe which is in the process of being prepared. Once the side members 82 have moved across the plate 32, the spring pulls the V-shaped frame back to the initial position and the ejector is ready for the next operation.

Reference should now be made to FIGS. 20 and 21 which show in more detail the spatula or skimmer 34 which is used for the purpose of removing a partly cooked crepe from the upper hot plate 31 when the upper hot plate is in the inverted position. The spatula or skimmer 34 consists essentially of a blade 85 in the form of a tongue which is able to project outwardly from the body portion 30 against the hot plate 31. The blade 85 is formed from spring material so that it may flex and follow the contour of the hot plate 31 when it is brought into contact therewith. The blade 85 contains a spigot 86 and the blade is adapted to slide within a housing 87. A pivotal arm 88 mounted on a shaft 89 is actuated by a solenoid 90 connected thereto by means of a linkage 91. The pivotal arm 88 includes a slot 92 which engages the spigot 86 and a return spring 93 is adapted to return the pivotal arm 88 to its initial position when the solenoid 90 is deactivated. As can be seen in FIGS. 20 and 21, pivotal movement of the arm 88 causes the blade 85 to slide in the housing 87 and location of the housing 87 within the body portion 30 is such that operation of the skimmer causes the blade 85 to project outwardly and upwardly from the body portion at a sharp angle in relation to the inverted position of the upper hot plate 31. Thus the control circuitry (not shown) is adapted to actuate the solenoid 90 at an appropriate time during the machine cycle so as to cause the blade 85 to contact the surface of the upper hot plate 31 and follow the contour thereof such that continued rotation of the upper hot plate 31 causes the blade to act as a spatula or skimmer and lift a partly cooked crepe from the surface of the hot plate 31. With the assistance of gravity, a partly cooked crepe on the surface of hot plate 31 is caused to fall therefrom to a position on the lower hot plate 32 in which case it is inverted relative to the hot plate for cooking on the opposite side.

Having described the essential features of the apparatus, its operation will now be described with particular reference to FIGS. 5 to 14 of the drawings. In order to use the machine, the tank 39 is firstly filled with a pre-made batter mix which, in the case of making crepes, consists of flour (wheat, buck wheat, rice, etc.), milk and/or water and it can also include salt, sugar, eggs and some flavourings. Fat is also included under the form of butter or margarine, oil or the like for the purpose of not only improving the taste of the finished product, but more importantly for lubricating the hot plates and avoiding the product sticking thereto. Usually the flour is plain flour and no artificial or natural yeast is used. The pre-made batter mix is put in the container 39 which has presumably been cleaned subsequent to is previous use along with the piston 66, rod 67, flexible tube 76 and pouring tube 38 all of which may be readily removed from the body portion 30 for the purpose of cleaning.

Figure 5:
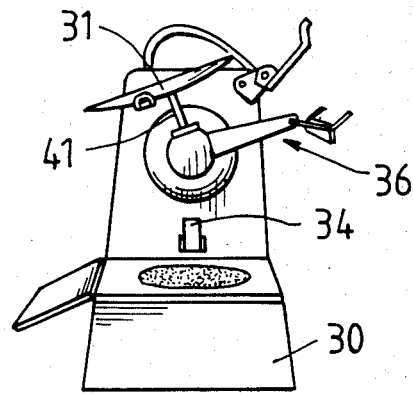
Figure 6:
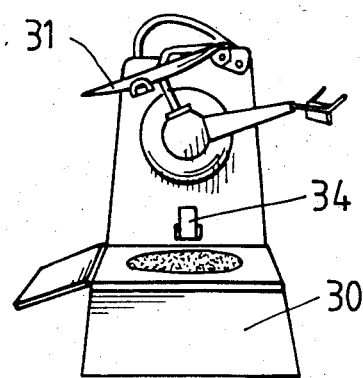
Figure 7:
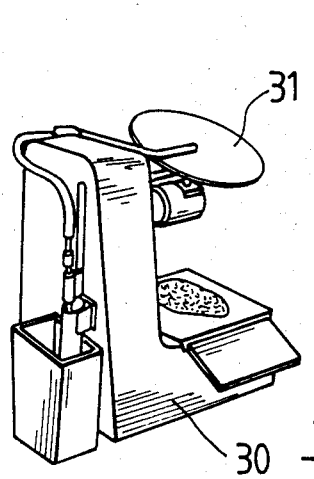
Figure 8:
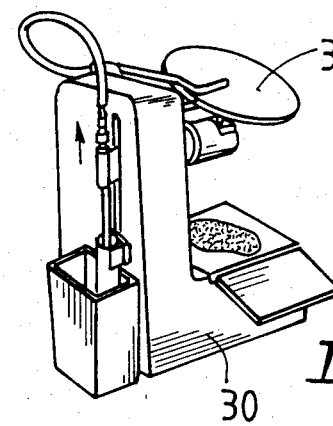
Figure 9:
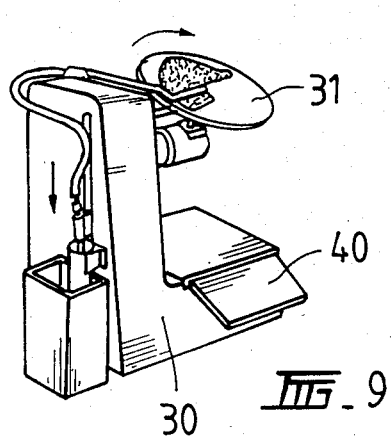
Figure 10:
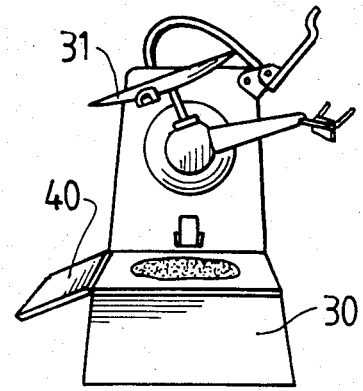

FIG. 5 shows the apparatus in the neutral position at the commencement of a cycle, although in FIG. 5 the apparatus has been previously in use since a partly prepared crepe is on the lower hot plate 32. At the commencement of a machine cycle, the pouring tube 38 pivots to a position over the upper hot plate 31 as shown in FIG. 6. The hot plate 31 is caused to rotate by actuation of the motor 42 and then the pump motor 73 is initiated to cause a quantity of the batter mix to be pumped through the pouring tube 38 and onto the upper hot plate 31 to provide an even distribution of the mixture over the rotating plate as can be seen in FIG. 9. The ejection of the mixture through the pouring tube 38 continues through one revolution of the plate 31 and any adjustment necessary to achieve the correct amount of mixture is readily effected by adjusting the adjustable collar 69. At this stage of the cycle, the pouring tube 38 is pivoted back to its initial position away from the upper hot plate 31 and a heating element 33 is initiated to provide heat to the underside of the hot plate 31. The heating element 33 projects from a front or forwardly directed face of the body portion 30.

The heating element 33 is retained in the on condition for a time sufficient to allow the upper hot plate 31 to cook one side of the crepe and this time may be varied by adjusting a control knob (not shown) of the control circuitry (not shown). The continued rotation of the plate 31 ensures that one side of the crepe is evenly cooked and when this has been achieved, the apparatus proceeds to the next stage of operation wherein the hub 35 is rotated using the clutch mechanism previously described. Rotation of the hub 35 causes the ejector 36 to move across the lower hot plate 32 in the manner previously described and in each cycle after the first cycle, the ejector 36 removes a finished crepe from the bottom hot plate 32 and on to the exist ramp 40. Continued rotation of the hub causes the upper hot plate 31 to reach a position where it is inverted over the lower hot plate 32 at which time the skimmer mechanism 34 is actuated to lift the partly cooked crepe from the upper hot plate 31 and cause it to fall onto the lower hot plate 32. This causes the partly cooked crepe to be inverted so that the opposite side is cooked by means of the lower hot plate 32 which is heated by a heating element (not shown) thereunder.

After the hub 35 has reached its maximum position of rotation in a first direction (see FIG. 12), it remains in such position for approximately four seconds while the partly cooked crepe is removed from the upper hot plate after which time rotation of the motor 42 is reversed and the clutch is operated to cause the hub to rotate in the opposite direction returning the upper hot plate back to its initial position. Once the upper hot plate 31 has reached its initial position, the original direction of rotation of motor 42 is established and the next injection operation is ready to commence. The machine will continue to work through this cycle until it is switched off.

It should be mentioned that when the apparatus is first used after refilling of the tank 39, it is necessary to prime the pump unit 37. This is achieved by immersing the piston 66 in the batter whilst it is secured on its bracket 64 and holding the pouring tube 38 above the tank 39. A control knob (not shown) for the control circuitry is switched to a "manual" position and a pushbutton (not shown) is pressed to cause the piston to make one upward stroke followed by one downward stroke and the operation is repeated until the pump is primed. The batter which is ejected through the pouring tube 38 during the priming operation flows back into the tank 39. Once this priming operation is completed, the pouring tube 38 is clipped in position on its bracket 79. The control knob is then switched to the automatic position and the machine proceeds with its cyclic operation as described above. A thermostat (not shown) is provided for controlling the cooking temperature of the upper and lower hot plates and when the thermostat on the bottom hot plate operates the pouring tube 38 is pivoted into the operational position.

It should be evident that the batter mix ejected from the pouring tube 38 runs down the upper hot plate 31 due to the angle of inclination thereof, but at the same time rotation of the hot plate 31 presents a new area to the batter mix being poured. The combination of the aperture sizes, the intervals between the apertures, the pouring rate, the rotational speed of the plate 31, the diameter of the plate 31, the concavity of the plate 31 and the angle of inclination thereof results in an even and controlled spreading of the batter mix. The cooking time for a crepe on the upper hot plate 31 is approximately 150 seconds.

As mentioned previously, the controls for the machine are electronic and electromechanical and include an adjustable timer. The control circuitry is not disclosed herein as it is considered that any person skilled in the art can readily appreciate the requirements for electronically and electromechanically controlling the machine.

It should be evident that the present invention provides a much improved machine for manufacturing crepes and other like foodstuffs and facilitates a high degree of hygiene in the manufacturing process. The tank 39 and all the apparatus associated with pumping the pre-made mixture onto the upper hot plate 31 are readily dismountable from the machine for cleaning purposes as they are all clipped to outside of the body portion 30. Cleaning can be done in a matter of seconds as with any standard cooking utensils. From a safety point of view, if something should impede the rotation of the hub 35, the unique clutch arrangement will disengage and recovery will occur by switching the machine from automatic to manual and back to automatic again.

The simplicity of the machine renders it extremely economical to manufacture and thus it is suitable for use as a domestic appliance although use in commercial situations such as fast food shops, is clearly an area where the use should be extensive. In commercial situations, or in industrial situations for manufacturing packaged frozen foods, the apparatus may be modified to include a plurality of upper and lower hot plates on the same rotatable hub whereby a number of crepe or like foods may be manufactured at the same time.

Clearly other modifications to the above described embodiment may be readily envisaged by persons skilled in the art. For example, according to another embodiment, the top heating element and the spatula or skimmer are fixed on to the rotatable hub. The skimmer operates from a central cam during the downstroke rotation of the hub and the rotation proceeds only in one direction so that a complete revolution of the hub is required in order to return the upper hot plate 31 to its initial position. This requires the heating element for the upper hot plate to be mounted on the hub and to rotate therewith which further requires a sliding electrical connection between the control circuitry within the body portion and the rotatable hub. A set of brushes is required for this purpose. According to this embodiment, the bottom hot plate is slightly offset and inclined to compensate for inertia of the partly cooked crepe when it is removed from the upper hot plate during its rotation on the hub to an inverted position.

In a modification to the embodiment previously described, the upper hot plate 31 may take the form of a flat disc rather than a concave disc in which case it is necessary for the disc to have upturned edges to prevent the mixture from flowing off the plate and to ensure a disc-like formation of the mixture on the rotating plate. This modification is not generally desirable since it creates difficulties for the spatula or skimmer 34 in engaging the inverted upper hot plate to release a partly cooked product. The concave hot plate readily enables the skimmer 34 to follow its contour for the purpose of releasing the partly cooked product.

The claims form part of the disclosure of this specification.

What is claimed is:

1. A machine for manufacturing cooked foodstuffs in the form of crepes and the like, characterized in that, said machine includes a first hot plate (31) in the form of a disc rotatable about its central axis and having an upwardly directed cooking surface which is inclined to the horizontal and has a concave shape adapted to form a pre-made food mixture poured thereon into a disc-like configuration during rotation, heating means (33) associated with said first hot plate to heat said hot plate (31) so as to cause at least one side of said disc-like mixture to be cooked, and said first hot plate (31) is adapted for automatic movement to an inverted position when said one side is cooked so as said foodstuff is released therefrom.

2. A machine as defined in claim 1, characterized in that, a second hot plate (32) is arranged beneath the inverted position of said first hot plate (31) whereby said foodstuff released from said first hot plate (31) falls onto said second hot plate (32) with the opposite side of said foodstuff in contact therewith.

3. A machine as defined in claim 2, characterized in that a pouring (38) tube is arranged over said disc to pour a predetermined amount of said pre-made food mixture thereon, said pouring tube (38) extends radially over said disc and has radially spaced pouring holes (78) therein; the direction of rotation of said disc relative to said tube (38) is such as to carry said mixture upwardly on the slope of said inclined surface and said pouring tube (38) is adapted to dispense a substantially constant quantity of mixture per surface area of the plate whereby a substantially even thickness of mixture is achieved on said surface.

4. A machine for manufacturing cooked foodstuffs in the form of crepes and the like, characterized in that, said machine includes a first hot plate (31) in the form of a rotatable disc, a pouring tube (38) over said plate for dispensing a predetermined amount of a pre-made food mixture onto an upwardly directed cooking surface of said plate, said surface is inclined to the horizontal and has a shape adapted to form said mixture thereon into a substantially disc-like configuration during rotation, said pouring tube extends substantially radially over said plate and the direction of rotation relative to said tube is such as to carry said mixture upwardly on the slope of said inclined surface, the pouring tube (38) being adapted to dispense a substantially constant quantity of mixture per surface area of the plate, whereby a substantially constant thickness of mixture is achieved on said surface, and said first hot plate (31) is adapted for movement to an inverted position, when one side of said foodstuff is cooked, wherein said partly cooked foodstuff is released so as to fall onto a second hot plate (32) for cooking the other side thereof.

5. A machine according to claim 4, characterized in that, said shape is in the form of an upwardly directed concave disc and a combination of said shape, the angle of said inclination, the speed of said rotation and the rate of said dispensing causes said mixture to form said disc-like configuration which is a thin substantially uniform disc on said surface.

6. A machine according to claim 5, characterized in that, said pouring tube is mounted on a body portion (30) of said machine in a manner facilitating pivotal movement of the tube (38) from said position over said first plate (31) to a position away from said first plate (31) for avoiding coagulation of said mixture in said tube (38) due to heat dissipated by said first plate (31).

7. A machine according to claim 6, characterized in that, said first hot plate (31) is mounted on a rotatable hub (35), whereby said movement of said disc to an inverted position is effected at the appropriate time during a machine cycle, said hub (35) has an ejector mechanism (36) mounted thereon whereby rotation of the hub causes the ejector mechanism (36) to push a completely cooked product off said second hot plate (32) prior to the release of a partly cooked product from said first hot plate (31) onto said second hot plate (32).

8. A machine according to claim 7, characterized in that, said machine includes a skimmer mechanism (34) mounted on said body portion and having a resilient blade (85) adapted for movement into contact with said rotating hot plate (31) when said hot plate is in said inverted position, said blade following the surface contour of said hot plate to thereby release said partly cooked product therefrom in the event that it has adhered to the plate during the cooking process.

9. A machine according to claim 8, characterized in that, said rotatable disc is mounted on a spindle (41) which is rotated by a reversible electric motor (42) within said body portion via a drive shaft (47) and bevel gears (43) between said drive shaft and spindle, and said drive shaft incorporates an electrically operated clutch mechanism (44) in the form of an epicyclic gear train (45) and cam arrangement for imparting by-directional rotational movement to said rotatable hub at the appropriate time during a machine cycle.

10. A machine according to claim 9, characterized in that, separate electric heating elements are mounted on said body portion and extend under the respective hot plates to provide radiant heat thereto, the element (33) associated with said first hot plate extends thereunder when said first hot plate is in the initial or upright position.

11. A machine according to claim 10, characterized in that, said epicyclic gear train comprises a pinion gear (46) fixed to said drive shaft, satellite gears (48) around said pinion and each mounted on a respective shaft (49) fixed relative to said hub, a crown gear (50) surrounding said satellite gears and adapted to run free on said satellite gears when said clutch mechanism is disengaged, and means for engaging said crown gear whereby rotation thereof is prevented so as to cause rotation of said hub from said drive shaft via said satellite gears.

12. A machine according to claim 11, characterized in that, said cam arrangement includes a cam member (51) fixed to said hub, said cam member has first and second stop surfaces (52,53) between which limited rotational movement extends, said means for engaging said crown wheel comprises a spigot (56) adapted to engage between indentations on the outer circumferential surface of said crown wheel, said spigot forms part of a control mechanism which includes a further spigot (57) fixed to the first mentioned spigot and spaced therefrom so as to move in unison therewith, said further spigot is adapted to engage one or the other of said stop surfaces to prevent rotation of said hub and when released from a said stop surface allows rotation of said hub until the other of said stop surfaces engages said further spigot, said first mentioned spigot is free of said indentations when said further spigot engages a stop surface and engages said indentations when said further spigot is released.

13. A machine according to claim 12, characterized in that, said control mechanism is actuated by a solenoid (59).

14. A machine according to claim 13, characterized in that a microswitch (61) is engaged by said control mechanism to maintain said solenoid energized during engagement of said clutch mechanism and is released by said control mechanism when said other of said stop surfaces engages said further spigot causing rotation of said driven member to stop and said first mentioned spigot to be carried out of its position between said indentations due to forced rotation of said crown wheel.

* * * * *